United States Patent [19]

Nishioka et al.

[11] Patent Number: 5,192,366
[45] Date of Patent: Mar. 9, 1993

[54] CEMENT ADMIXTURE AND CEMENT COMPOSITION

[75] Inventors: Asaaki Nishioka; Etsuo Sakai, both of Machida; Tomohiro Kaneko, Ichihara; Masaki Ogasawara, Machida, all of Japan

[73] Assignee: Denki Kagaku Koygo Kabushiki Kaisha, Tokyo, Japan

[21] Appl. No.: 621,878

[22] Filed: Dec. 4, 1990

[30] Foreign Application Priority Data

Dec. 5, 1989 [JP] Japan .................................. 1-315746
Dec. 5, 1989 [JP] Japan .................................. 1-315748

[51] Int. Cl.$^5$ .............................................. C04B 24/00
[52] U.S. Cl. .................................. 106/724; 106/802; 106/823; 524/2; 524/4; 524/8
[58] Field of Search .................. 106/724, 802, 823; 524/2, 4, 8

[56] References Cited

U.S. PATENT DOCUMENTS

4,849,018  7/1989  Babcock et al. ................... 106/695

FOREIGN PATENT DOCUMENTS

8605        3/1980  European Pat. Off. .
2246511   5/1975  France .
55-085444 6/1980  Japan .

OTHER PUBLICATIONS

Chemical Abstracts, vol. 95, No. 18, Columbus, Ohio, USA and JP-A-56050154 (Shin-Etsu Chemical Industry Co) May 3, 1981 ref. No. 155432C *abstract*.
Chemical Abstracts, vol. 100, No. 10, Columbus, Ohio, USA and JP-A-58138764 (Asahi Chemical Industry Co.) Aug. 17, 1983 ref. No. 73065T *abstract*.
Chemical Abstracts vol. 98, No. 8, Columbus, Ohio, USA and JP-A-57129852 (Denki Kagaku Kogyo K.K.) Aug. 12, 1982 ref. No. 58968M *abstract*.
Chemical Abstracts, vol. 82, No. 8, Apr. 21, 1975 Columbus, Ohio, USA and JP-A-4996831 (Sumitomo Chemical Co.) Sep. 18, 1974 ref. No. 102464Q *abstract*.

Primary Examiner—Karl Group
Assistant Examiner—Anthony J. Green
Attorney, Agent, or Firm—Oblon, Spivak, McClelland, Maier & Neustadt

[57] ABSTRACT

A cement admixture comprising a polymer latex and a water reducing agent as effective components, wherein the polymer latex comprises a copolymer of monomers comprising ethylene, vinyl acetate and an acrylic ester, and an emulsion stabilizer, said emulsion stabilizer being a surfactant.

8 Claims, No Drawings

CEMENT ADMIXTURE AND CEMENT COMPOSITION

The present invention relates to a cement admixture and an inorganic hydraulic cement composition having the fluidity improved. Particularly, it relates to a cement additive admixture and a cement composition useful for various applications including applications as concrete materials having high density and excellent durability, as repair materials, as floor materials, as water preventing materials, as adhesive materials and as building materials.

In recent years, the durability of reinforced concrete structures has been problematic, and it has been desired to develop reliable repair materials.

Namely, with respect to concrete structures, there has been a problem that the durability of concrete deteriorates due to the following reasons:

(1) Due to carbonation caused by the penetration of carbon dioxide gas from the surface of the concrete, the pH of the interior of the concrete lowers, whereby the steel bar (reinforced) will be corroded.

(2) The steel bar will be corroded by the penetration of chlorine ions from the exterior of the concrete to the interior thereof.

(3) Silicious mineral in the aggregate undergoes an expansion reaction with an alkali eluted from the cement.

(4) When sea sand is used as the aggregate, the steel bar will be corroded.

To solve such problems, particularly the problems identified in items (1) and (2), a repair technique has been studied which comprises scraping off the concrete from the corroded portion of the steel bar, then applying rust-preventing treatment to the steel bar and then injecting a repair polymer modified cement employing various polymers such as polymers of acrylate type, vinyl acetate type, vinylidene chloride type, vinyl chloride type, styrene-butadiene type and chloroprene type, to improve the bonding to the concrete.

The reasons for employing such polymers are:

① To improve the adhesive strength to the old concrete;

② To prevent cracking of thin layer repair portions; and

③ To improve the flexural strength of the repair mortar and to impart resiliency.

Japanese Examined Patent Publication No. 33054/1972 discloses a modified cement product having an ethylene-vinyl acetate copolymer latex with a vinyl acetate component content of from 60 to 90 parts by weight incorporated to cement in an amount of from 2 to 40 parts by weight as solid content.

Further, Japanese Unexamined Patent Publication No. 85444/1980 discloses a cement product having a vinyl acetate-ethylene-acrylate copolymer latex (50-95/5-49.5/0.5-45 parts by weight) incorporated to cement in an amount of from 1 to 30 parts by weight as solid content.

Japanese Unexamined Patent publication No. 61338/1989 discloses a cement admixture comprising an ethylene-vinyl acetate copolymer latex having an average particle size of from 0.2 to 0.5 μm and an ethylene content of from 10 to 25 parts by weight, wherein as an emulsion stabilizer, a certain specific colloid and a certain specific surfactant are employed.

However, to secure the fluidity with such conventional cements containing various polymers, it was necessary to adjust the water/cement ratio at a high level, and the structure of the resulting concrete tended to be coarse, whereby the permeation rate of noxious gas or chlorine ions was high, and it was difficult to sufficiently prevent the corrosion of the steel bar located in the interior of the concrete.

Further, in order to increase the durability of concrete, it has been known to employ a water reducing agent as a cement admixture to reduce the water/cement ratio without impairing the fluidity, to prevent the permeation of noxious gas or chlorine ions and to improve the durability of the concrete. Namely, the water reducing agent is a cement admixture to reduce the water/cement ratio without impairing the fluidity, to prevent the permeation of noxious gas or chlorine ions and to improve the durability of concrete. For example, water reducing agents comprising a salt of a naphthalene sulfonic acid formaldehyde condensation product, a salt of a melamine sulfonic acid formaldehyde condensation product, a high molecular weight lignin sulfonate or a polycarboxylate, as the main component are used. Among them, it is particularly preferred to employ a salt of a melamine sulfonic acid formaldehyde condensation product having a high condensation degree.

However, when such water reducing agents are used, cracking is likely to occur, since the water/cement ratio becomes low. If cracking occurs, the durability will be poor. Therefore, it has been desired to provide a concrete which is hardly susceptible to cracking.

Under these circumstances, it has been studied to incorporate to a repair cement a polymer latex which is capable of providing cracking resistance and adequate adhesive strength to concrete. However, it has been very difficult to secure the fluidity while incorporating a water reducing agent to reduce the water/cement ratio.

The present inventors have conducted various studies to solve the above problems and as a result, have found it possible to provide a polymer modified cement composition having the fluidity improved, by using a certain specific copolymer latex and a water reducing agent having a specific composition. The present invention has been accomplished on the basis of this discovery.

Thus, the present invention provides a cement additive admixture comprising a polymer latex and a water reducing agent as effective components, wherein the polymer latex comprises a copolymer of monomers comprising ethylene, vinyl acetate and an acrylic ester, and an emulsion stabilizer, said emulsion stabilizer being a surfactant.

Further, the present invention provides a polymer modified cement composition comprising the above cement additive admixture and cement as the main components.

Now, the present invention will be described in detail with reference to the preferred embodiments.

The copolymer latex to be used in the present invention contains a large amount of water. Therefore, it is possible to reduce the water content by employing a powder obtained by drying such copolymer latex.

Now, the copolymer latex as one of the essential constituents of the present invention will be described. The copolymer latex of the present invention comprises a copolymer of monomers comprising ethylene, vinyl acetate and an acrylic ester, and an emulsion stabilizer. The copolymer is preferably a copolymer of monomers comprising from 3 to 25 parts by weight of ethylene, from 2 to 60 parts by weight of vinyl acetate, from 25 to 85 parts by weight of an acrylic ester and from 0 to 10 parts by weight of other copolymerizable monomers.

If the ethylene content is less than 3 parts by weight, if the vinyl acetate content is less than 2 parts by weight, if the acrylic ester content is less than 25 parts by weight, or if the vinyl acetate content exceeds 60 parts by weight, when such a copolymer latex is admixed to cement, the fluidity tends to be poor, and the operation efficiency tends to be poor. Further, it tends to be difficult to obtain an adequate cracking resistance of the solidified cement product. On the other hand, if the ethylene content exceeds 25 parts by weight, or if the acrylic ester content exceeds 85 parts by weight, the cohesion of the polymer tends to be low, and when it is admixed with cement, the adhesive strength to the substrate tends to be low, such being undesirable.

As the acrylic ester to be used in the present invention, a soft polymer capable of imparting flexibility to improve the cracking resistance is preferred. Namely, it is preferred to employ an acrylic ester having a glass transition temperature (Tg) of $Tg \leq 020°$ C., such as ethyl acrylate, butyl acrylate, hexyl acrylate, octyl acrylate or 2-ethylhexyl acrylic ester. These acrylates can be used alone or in combination as a mixture of two or more.

For the preparation of the polymer latex of the present invention, conventional methods including batch polymerization methods and continuous polymerization methods may be employed.

For the preparation of a polymer latex by emulsion polymerization, it is common to employ as an emulsion stabilizer a colloid such as a polyvinyl alcohol (PVA) or hydroxyethyl cellulose (HEC) alone or together with a surfactant. However, as in the present invention, when a water reducing agent is to be incorporated, particularly, with a cement containing a polymer having the water/cement ratio reduced, there will be an adverse effect to the fluidity if such a colloid is used as an emulsion stabilizer. The detailed mechanism causing such an adverse effect to the fluidity is not clearly understood. However, it is believed that the thickening effect due to the formation of a complex of such a colloid with various salts used as water reducing agents, may be a cause.

The colloid causing an adverse effect to the fluidity includes cellulose derivatives such as carboxymethyl cellulose (CMC), methyl cellulose (MC), hydroxyethyl cellulose and hydroxypropyl cellulose (HPC), guar gum, gum arabic, acasia gum, tragacanth gum, tamarind seeds, gelatin, polyacrylamide and polyvinyl alcohol.

In the present invention, as the emulsion stabilizer, a surfactant is employed. In addition, a water-soluble oligomer formed during the polymerization process also serves as an emulsion stabilizer. Therefore, it is also effective to use a polymerization initiator at a high concentration.

The surfactant to be used as the emulsion stabilizer includes anionic, cationic and nonionic surfactants.

Anionic surfactants include sodium vinyl sulfonate, sodium styrene sulfonate, sodium 2-sulfoethyl methacrylate, sodium allyl alkyl sulfosuccinate, a sodium salt of a sulfuric acid ester of a higher alcohol and an ammonium salt of a polyoxyethylene alkylphenylether sulfate.

Cationic surfactants include 2-aminoethyl methacrylate hydrochloride and 2-hydroxy-3-trimethylaminopropyl methacrylate chloride.

Nonionic surfactants include a polyoxyethylene condensation product, a polyoxyethylene polyoxypropylene ether and a polyoxyethylene alkylphenyl ether.

It is particularly preferred to employ a nonionic surfactant of the formula $HO(C_2H_4O)_a-(C_3H_6O)_b-(C_2H_4O)_cH$ or

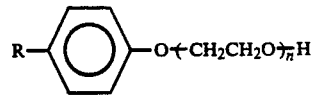

wherein R is a $C_6-C_{18}$ alkyl group, and having a HLB of from 14 to 19.

The surfactant is used usually in an amount of from 0.1 to 10 parts by weight relative to 100 parts by weight of the vinyl acetate and acrylic ester components in the copolymer latex. If the surfactant is less than 0.1 part by weight, it is difficult to conduct emulsion polymerization. On the other hand, if it exceeds 10 parts by weight, the surfactant tends to adversely affect the water resistance, the alkaline resistance and the water resistance.

As the polymerization initiator, a persulfate such as potassium persulfate, hydrogen peroxide, or various organic peroxides may be employed. In the case of a redox initiation system, sodium formaldehyde sulfoxylate or the like may further be used in combination as a reducing substance.

The copolymer in the copolymer latex to be used in the present invention may further contain one or more copolymerizable monomers in an amount not to interfere with the effects of the present invention i.e. usually up to 10 parts by weight.

Such comonomers include a vinyl cyanide monomer such as acrylonitrile or methacrylonitrile, an unsaturated carboxylic acid monomer such as acrylic acid, methacylic acid, itaconic acid or crotonic acid, a methacrylate monomer such as methyl methacrylate, ethyl methacrylate, butyl methacrylate, hydroxyethyl methacrylate or glycidyl methacrylate, a vinyl ether monomer such as methyl vinyl ether, ethyl vinyl ether, butyl vinyl ether or phenyl vinyl ether, an amide monomer such as acrylamide or methacrylamide, a maleimide monomer such as maleimide, N-methylmaleimide, N-ethylmaleimide, N-propylmaleimide, N-phenylmaleimide or N-toluylmaleimide, a haloganated olefin monomer such as vinyl chloride or vinylidene chloride, and a polyfunctional vinyl monomer such as divinyl benzene, ethylene glycol dimethacrylate, 1,3-butylene glycol dimethacrylate, 1,4-butylene glycol dimethacrylate, propylene glycol dimethacrylate, polyethylene glycol dimethacrylate, polypropylene glycol dimethacrylate, ethylene glycol diacrylate, polyethylene glycol diacrylate, triallyl cyanurate, triallyl isocyanurate, trimethylol propane trimethacrylate, allyl acrylate or allyl methacrylate.

Further, conventional additives such as a pH controlling agent (buffer), a defoaming agent and an antiseptics may be incorporated as the case requires.

The size of the particles in the copolymer latex thus obtained is preferably within a range of from 0.05 to 5 μm.

The copolymer latex of the present invention thus obtained is preferably used in an amount of from 4 to 150 parts by weight as solid content relative to 100 parts by weight of cement. If the amount is less than 4 parts by weight as solid content, no adequate adhesive strength will be obtained. On the other hand, even if it is added beyond 150 parts by weight as solid content, no further increase of the adhesive strength will be obtained, and the abrasion resistance or strength of the surface and the weather resistance tend to be inadequate.

The water reducing agent and superplasticizer to be used in the present invention may be at least one member selected from the group consisting of a salt of a naphthalene sulfonic acid formaldehyde condensation product, a salt of an alkyl- naphthalene sulfonic acid formaldehyde condensation product, a salt of a melamine sulfonic acid formaldehyde condensation product, a lignin sulfonate, a high molecular weight lignin sulfonate, a polycarboxylate and a polystyrene sulfonate. From the viewpoint of e.g. the solidification time, it is particularly preferred to employ a salt of a melamine sulfonic acid formaldehyde condensation product with a high condensation degree.

As the salt of a melamine sulfonic acid formaldehyde condensation product to be used in the present invention, "Seakament" trade name, manufactured by Nippon Seaka K. K. or "Melment" trade name, manufactured by Showa Denko K. K., may be mentioned.

The naphthalene sulfonic acid formaldehyde condensation product or the alkylnaphthalene sulfonic acid formaldehyde condensation product is used usually in the form of an alkali metal salt, an alkaline earth metal salt or an ammonium salt. As such a salt, sodium $\beta$-naphthalene sulfonate or potassium $\beta$-naphthalene sulfonate may be mentioned. As commercial products, "Denka FT-500" trade name, manufactured by Denki Kagaku Kogyo K. K. and "Selfro-110P" trade name, manufactured by Daiichi Kogyo Seiyaku K. K., may be mentioned.

As the lignin sulfonate, "Sanflow K" trade name, manufactured by Sanyo Kokusaku Pulp Co., Ltd. or "Lignal G" trade name, manufactured by Kobe Zairyo K. K. may be mentioned.

As the refined lignin sulfonate having high molecular weight, "Ultragin" trade name, manufactured by Bolgard Company, may be mentioned. As the polycarboxylate, there may be mentioned "600S" trade name, manufactured by Nippon Shokubai Kagaku Kogyo K. K. obtained by reacting an alkylene amine and/or an alkylene oxide to a carboxyl group-containing polymer for addition reaction, "Work 500" or "M-10" trade name, manufactured by Nihon Zeon K. K. which is a hydrolyzate of a product obtained by copolymerizing an olefin with an ethylenically unsatulated dicarboxylic anhydride, and a hydrolyzate of a copolymer of an olefin with maleic anhydride or a copolymer of styrene or other copolymerizable monomer with maleic anhydride, which is a gradual releasing type exhibiting fluidity by being gradually hydrolyzed by an alkali from the cement in the form of an anhydride.

The water reducing agent and superplasticizer of the present invention may be added in a powder form. However, it is of course possible to add it in the form of a liquid.

The water reducing agent and superplasticizer is used usually in an amount of from 0.15 to 5 parts by weight relative to 100 parts by weight of cement. Also in the present invention, it is preferred to add it in a similar amount, more preferably from 0.15 to 4 parts by weight, although the amount varies depending upon the water/cement ratio. If the amount is less than 0.15 part by weight, it tends to be difficult to obtain adequate fluidity, and if it exceeds 5 parts by weight, no further improvement in the fluidity will be obtained.

In the cement additive admixture of the present invention, the ratio of the solid content of the copolymer latex to the water reducing agent and superplasticizer is preferably within a range of from 98:2 to 10:90 by weight.

The amount of water to be incorporated should better be as low as possible relative to cement from the viewpoint of the object of the present invention.

Here, cement is a material composed essentially of a cement material.

As the cement material, it is common to employ various Portland cements such as normal Portland cement, high early strength Portland cement, super high early strength Portland cement and white Portland cement, as well as rapid hardening cements and alumina cements.

As the rapid hardening cements, "Jet cement" trade name, manufactured by Onoda Cement Co., Ltd. and "Denka Super Cement" trade name, manufactured by Denki Kagaku Kogyo K. K., may be mentioned.

As the alumina cements, "Denka Alumina Cement No. 1" and "Denka Alumina Cement No. 2" trade names, manufactured by Denki Kagaku Kogyo K. K., may be mentioned.

Further, low exothermic cements such as moderate heat cement, blast furnace cement and fly ash cement as well as sulfate resistant cements, may also be used. Furthermore, if a suitable aging method is employed, calcium hydroxide or calcium oxide may also be used. Further, it is possible to use a cement material containing blast furnace slag or fly ash in a larger amount than usual blended cements. High sulfate slag cement or improved blast furnace cement may also be used.

When on alumina cement is used as the cement, it is preferred to employ as a hardening control agent one or more materials selected from the group consisting of various sulfates, nitrates and carbonates, other inorganic salts such as lithium salts and $CaCl_2$, inorganic substances such as $Ca(OH)_2$, borax and boric acid, and organic acids such as citric acid, tripolyphosphoric acid, pyrophosphoric acid, tartaric acid and gluconic acid and their salts.

The hardening control agent is used preferably in an amount of from 0.005 to 2 parts by weight relative to 100 parts by weight of the alumina cement.

The particle size of the cement material is usually within a range of from 5 to 30 $\mu$m. However, so long as it has a hydraulic property, the particle size may be smaller or larger than this.

Further, a rapid hardening and quick setting agent, an expansive agent, a high strength additive and various chemical additives which are commonly employed in cement concrete, may be used in combination with the cement material.

As the rapid hardening and quick setting agent, "Denka Natomic" or "Denka Cosmic" trade name, manufactured by Denki Kagaku Kogyo K. K., may be mentioned. As the expansive agent, "Denka CSA#20" trade name, manufactured by Denki Kagaku Kogyo K. K., may be mentioned. As the high strength additive, "Denka $\Sigma$-1000" trade name, manufactured by Denki Kagaku Kogyo K. K., may be employed.

In the present invention, it is effective to use inorganic ultrafine particles in combination with the cement to attain a lower water/cement ratio.

The ultrafine particles used here are particles which have an average particle size smaller by at least 1 order, preferably by 2 order, than the average particle size of the cement material. More preferably, their average particle size is not higher than 1 μm.

With respect to the composition of the ultrafine particles, there is no particular restriction. However, material readily soluble in water is not suitable. They may be prepared by any method such as a liquid phase method, a vapor phase method, a pulverization method or a classification method, or a combination thereof. From the economical viewpoint, it is advantageous to use those prepared by pulverzation and classification, those produced in a vapor phase as by-products such as silica dust (silica fume) obtained as by-product during the preparation of silicon, a silicon-containing alloy or zirconia, as well as fine powders such as blast furnace slag, fly ash, silica gel, opalic silica, clay mineral such as bentonite or fired products thereof, or amorphous alumina silicate. They can be prepared by means of a combination of a mill and an air separator. By the use of such ultrafine particles, freeze and fusion resistance will be improved.

Further, ultrafine powder of e.g. calcium carbonate, titanium oxide, aluminum oxide, zirconium oxide, various glass materials, chromium oxide and active carbon, may be used in combination.

The ultrafine particles may be used preferably in an amount of from 5 to 100 parts by volume, more preferably from 10 to 50 parts by volume, per 100 parts by volume of the cement material from the viewpoint of the density of the kneaded mixture and the high strength characteristics. If the amount is less 5 parts by volume, no adequate effect for improving the density of the kneaded mixture will be obtained as compared with the case where no ultrafine particles are incorporated. On the other hand, if the amount exceeds 50 parts by weight, the abrasion resistance of the surface or the strength characteristics tend to be inadequate as compared with the case where no ultrafine particles are incorporated. In a case where only the durability attributable to the density is to be improved, a certain effect can be attained even when the amount is less than 5 parts by weight.

When the cement additive admixture of the present invention contains ultrafine particles, the ratio of the solid content of the copolymer latex to the ultrafine particles is usually within a range of from 95:5 to 5:95 by weight, preferably from 90:10 to 50:50 by weight, more preferably from 70:30 to 50:50 by weight.

When the copolymer latex is added to a hydraulic material, it sometimes happens that air bubbles are accompanied, and the strength and the density of the resulting solidified product becomes low. In such a case, it is preferred to use a defoaming agent in combination.

Such defoaming agent includes an oil type deforming agents such as sesame oil, a fatty acid type defoaming agent such as stearic acid, an alcohol type defoaming agent such as octyl alcohol, a partial ester of a polyhydric alcohol with a fatty acid such as a sorbitan fatty acid ester, polyoxyethylene polyoxypropylene ether, paraffin and a silicon type defoaming agent.

Commercial products include "TSA 732" (silicon type) trade name, manufactured by Toshiba Silicon K. K., "Kararin 302" (alcohol type) trade name, manufactured by Sanyo Kasei Kogyo K. K., "Pronal 502" (polyoxyethylene polyoxypropylene ether type) trade name, manufactured by Toho Cehmical Industry Co., Ltd. and "Antiform E-20" trade name, manufactured by Kao Corporation.

Such defoaming agent is used usually in an amount of from 1 to 5 parts by weight per 100 parts by weight of the solid content of the copolymer latex.

When the cement material and the ultrafine particles are used as the cement, and a water reducing agent is used in an amount of from 1 to 3 parts by weight per 100 parts by weight of the cement, it is preferred to adjust the amount of water to a level of not higher than 45 parts by weight per 100 parts by weight of the cement in order to secure excellent fluidity. Even a water/cement ratio of not higher than 30% is practically feasible. When the amount of water is not higher than 45 parts by weight, the strength and the density will further be improved, whereby the defusion coefficient of chlorine ions or the water permeation coefficient will be substantially small.

Further, when the ultrafine particles are incorporated, the amount of water is preferably not higher than 30 parts by weight, more preferably not higher than 28 parts by weight, with a view to securing excellent fluidity.

In the present invention, it is possible to incorporate aggregates having particle sizes larger than the above mentioned various materials.

The aggregates are those having particle sizes exceeding 100 μm. As such aggregates, it is possible to use usual sand, gravel or light weight aggregates. It is of course possible to use hard aggregates selected to have a Moh's hardness of at least 6 or a Knoop indenter hardness of at least 700 kgf/mm$^2$. Further, glass or metal may also be used as aggregates.

The aggregates are used usually in an amount of up to 1,000 parts by weight per 100 parts by weight of the cement. However, the amount is not limited to such a range in the case of a special construction method such as a prepacked concrete or a post packed concrete method.

There is no particular restriction as to the method of admixing or the order of adding the above materials, so long as they can be admixed uniformly. The admixed product may be used by injection or coating.

Further, in the present invention, the above materials may be combined with reinforcing materials such as iron frames or iron cores, or fibers to reinforce the tensile or flexural strength.

Examples of such fibers include metal fibers such as fibers obtained by milling cast iron, steel fibers and stainless steel fibers, various natural or synthetic mineral fibers such as asbestos, ceramic fibers, synthetic fibers of e.g. polypropylene and alumina fibers, carbon fibers and glass fibers.

Further, it is possible to use steel rods or molded products of alumina fibers which have been commonly used as reinforcing materials. These reinforcing materials are often required particularly for large-sized objects.

There is no particular restriction as to the aging of the kneaded product obtained by kneading the cement composition of the present invention thus obtained. However, it is preferred to conduct a wet aging at first and then a dry aging.

The kneaded product of the cement composition of the present invention thus prepared may be used for various applications including durable concrete structures or repair materials for rust-preventive coating of corroded steel bar, or for covering the peeled portions of the concrete structures, paving materials for pavements, water-preventing materials such as floor materials or roof slabs, adhesives for tiles, decorative finishing materials, floor materials for chemical plants, corrosion preventing materials such as ceiling materials for acid resistant tiles and deck covering materials.

Now, the present invention will be described in further detail with reference to Examples. However, it should be understood that the present invention is by no means restricted to such specific Examples.

Aggregate: "Silica sand No. 7" trade name, manufactured Hisago Sangyo K. K.

Defoaming agent: "TSA 732" trade name, manufactured by Toshiba Silicon K. K.

Water reducing agent: "Selfro-110P" trade name, manufactured by Dai-ichi Kogyo Seiyaku Co., Ltd., main component: a naphthalene sulphonic acid formaldehyde condensation product

TABLE 1

| Test No. | Mortar composition (parts by weight) | | | | | | | Copolymer latex composition (parts by weight) | | | | | Mortar flow value (mm) | Notes |
|---|---|---|---|---|---|---|---|---|---|---|---|---|---|---|
| | Cement | Ultrafine particles | Aggregate | Copolymer latex | Defoaming agent | Water reducing agent | Water | Copolymer composition | Emulsion stabilizer composition | | | Water | | |
| | | | | | | | | | Nonionic | PVA | HEC | | | |
| 1-1 | 180 | 20 | 100 | 20 | 0.2 | 2 | 80 | E:VAc:2EHA = 8:40:42 | 2.0 | 5.0 | 1.0 | 100 | 165 | Comparative Example |
| 1-2 | 180 | 20 | 100 | 20 | 0.2 | 2 | 80 | E:VAc:2EHA = 8:40:42 | 8.0 | 0 | 0 | 100 | 245 | Example |
| 1-3 | 180 | 20 | 100 | 20 | 0.2 | 3 | 80 | E:VAc:2EHA = 8:40:42 | 2.0 | 5.0 | 1.0 | 100 | 172 | Comparative Example |
| 1-4 | 180 | 20 | 100 | 20 | 0.2 | 3 | 80 | E:VAc:2EHA = 8:40:42 | 8.0 | 0 | 0 | 100 | >300 | Example |
| 1-5 | 180 | 20 | 100 | 20 | 0.2 | 3 | 60 | E:VAc:2EHA = 8:40:42 | 8.0 | 0 | 0 | 100 | 250 | Example |

Cement, ultrafine particles, aggregate, copolymer latex (calculated as solid content) and defoaming agent are presented by "parts by weight".
Water reducing agent and water are presented by "parts by weight per 100 parts by weight of the total amount of cement and ultrafine particles".

EXAMPLE 1

An ethylene (E)/vinyl acetate (VAc)/2-ethylhexyl acrylate (2EHA) copolymer latex having a composition as shown in Table 1 was prepared, and a polymer-containing cement composition was kneaded to have a blend composition as shown in Table 1. The results are shown in Table 1.

CONDITIONS FOR PREPARING THE COPOLYMER LATEX

Into a stainless steel autoclave, water, VAc, 2EHA and an emulsion stabilizer were charged and heated to a temperature of 60° C. under stirring, and then ethylene was injected in a predetermined amount. Then, ammonium persulfate was added thereto to initiate the polymerization, and the polymerization was conducted until the residual monomer became not more than 0.5 part by weight. The product was cooled to obtain the copolymer latex.

MATERIALS USED

Cement: "Onoda White Cement" trade name, manufactured by Onoda Cement Co., Ltd., specific gravity: 3.14

Ultrafine particles: Silica fume, manufactured by Nippon Jyukagaku Kogyo K. K., average particle size: 0.2 $\mu$m as measured by TEM, specific gravity: 2.2

EXAMPLE 2

An E/VAc/2-ethylhexyl acrylate (2EHA) copolymer latex having a composition has identified in Table 2 was prepared, and a polymer-containing cement composition was kneaded to have a blend composition as identified in Table 2. The results are shown in Table 2.

CONDITIONS FOR THE PREPARATION OF THE COPOLYMER LATEX

The operation was conducted in the same manner as in Example 1 except that into the stainless steel autoclave, water, VAc, 2EHA and an emulsion stabilizer were charged with a composition as identified in Table 2.

The materials used for the mortar were the same as in Example 1. However, the following was used as the water reducing agent.

"Melment" trade name, manufactured by Showa Denko K. K., main component: a salt of a melamine sulphonic acid formaldehyde condensation product Emulsion Stabilizer: Nonionic surfactant; "Emulgen 985" trade name, manufactured by Kao Corporation, main component: polyoxyethylene alkylphenyl ether HLB = 18.9

PVA: "Denkapoval B-17" trade name, manufactured by Denki Kagaku Kogyo K. K.

HEC: "AH-15" trade name, manufactured by Fuji Chemical K. K.

TABLE 2

| Test No. | Mortar composition (parts by weight) | | | | | | | Copolymer latex composition (parts by weight) Copolymer composition |
|---|---|---|---|---|---|---|---|---|
| | Cement | Ultrafine particles | Aggregate | Copolymer latex | Defoaming agent | Water reducing agent | Water | |
| 2-1 | 180 | 20 | 100 | 20 | 0.2 | 2 | 70 | E:VAc:2EHA = 8:46:46 |
| 2-2 | 180 | 20 | 100 | 20 | 0.2 | 2 | 70 | E:VAc:2EHA = 18:82:0 |

TABLE 2-continued

| 2-3 | 180 | 20 | 100 | 20 | 0.2 | 3 | 70 | E:VAc:2EHA = 16:67:17 |
| --- | --- | --- | --- | --- | --- | --- | --- | --- |
| 2-4 | 180 | 20 | 100 | 20 | 0.2 | 3 | 70 | E:VAc:2EHA = 18:2:80 |
| 2-5 | 180 | 20 | 100 | 20 | 0.2 | 3 | 60 | E:VAc:2EHA = 18:2:80 |
| 2-6 | 200 | 0 | 100 | 20 | 0.2 | 2 | 70 | E:VAc:2EHA = 8:46:46 |
| 2-7 | 200 | 0 | 100 | 20 | 0.2 | 3 | 70 | E:VAc:2EHA = 8:46:46 |
| 2-8 | 180 | 20 | 100 | 20 | 0.2 | 3 | 70 | E:VAc:2EHA = 8:46:46 |
| 2-9 | 180 | 20 | 100 | 20 | 0.2 | 3 | 70 | E:VAc:2EHA = 18:2:80 |

| Test No. | Copolymer latex composition (parts by weight) Emulsion stabilizer composition | | | | Mortar flow value (mm) | Notes | Adhesive strength (kgf/cm$^2$) | Compression strength (kgf/cm$^2$) |
| --- | --- | --- | --- | --- | --- | --- | --- | --- |
| | Nonionic | PVA | HEC | Water | | | | |
| 2-1 | 8.0 | 0 | 0 | 100 | 218 | Example | 57 | 490 |
| 2-2 | 8.0 | 0 | 0 | 100 | 167 | Comparative Example | 59 | 490 |
| 2-3 | 8.0 | 0 | 0 | 100 | 157 | Comparative Example | 56 | 500 |
| 2-4 | 8.0 | 0 | 0 | 100 | >300 | Example | 54 | 485 |
| 2-5 | 8.0 | 0 | 0 | 100 | 252 | Example | 55 | 480 |
| 2-6 | 8.0 | 0 | 0 | 100 | 210 | Example | 50 | 470 |
| 2-7 | 8.0 | 0 | 0 | 100 | 215 | Example | 51 | 475 |
| 2-8 | 8.0 | 0 | 0 | 100 | >300 | Example | 54 | 480 |
| 2-9 | 8.0 | 0 | 0 | 100 | >300 | Example | 53 | 475 |

Test Nos. 2-1 to 2-5: Water reducing agent was "Salflow-110P" manufactured by Daiichi Kogyo Seiyaku.
Test Nos. 2-7 to 2-9: Water reducing agent was "Melment".

EXAMPLE 3 (COMPARISON IN THE FREEZE AND FUSION RESISTANCE BETWEEN ULTRAFINE PARTICLES+EVA AND EVA)

Using a blend composition as identified in Table 3 and a polymer-containing cement mortar adjusted to bring the cement/sand ratio to ⅓ and the mortar slump to 35±5 mm, a test for freezing and fusing was conducted. The results are shown in Table 3'.

MATERIALS USED

Cement: Normal Portland cement, manufactured by Denki Kagaku Kogyo K. K.

Silica sand: "Silica sand No. 6" manufactured by Tohoku Kaisha K. K.

Water: City water

Copolymer latex A: Ethylene-vinyl acetate copolymer manufactured by Denki Kagaku Kogyo K. K. (added in an amount calculated as solid content).

Copolymer latex B: A modified acryl-ethylene-vinyl acetate copolymer, manufactured by Denki Kagaku Kogyo K. K. (added as calculated as solid content).

TABLE 3'

| | | (Relative dynamic elastic modulus) Number of cycles*[1] | | | | | | | | | |
| --- | --- | --- | --- | --- | --- | --- | --- | --- | --- | --- | --- |
| No. | | 0 | 30 | 60 | 90 | 120 | 150 | 180 | 210 | 240 | 270 | 300 |
| 1 | % | 100 | 103 | 100 | 104 | 99 | 80 | 64 | 60 or less | — | — | — |
| 2 | % | 100 | 101 | 100 | 98 | 95 | 85 | 80 | 76 | 72 | 67 | 60 |
| 3 | % | 100 | 100 | 100 | 102 | 104 | 97 | 100 | 98 | 100 | 101 | 102 |

*[1]: Number of cycles of freezing and fusing

TABLE 3

| | (Parts by weight) | | | | | |
| --- | --- | --- | --- | --- | --- | --- |
| Test No. | Cement | Silica sand | Water | Water reducing agent | Ultrafine particles | Copolymer latex |
| 3-1 | 100 | 300 | 61 | 0 | 0 | A10 |
| 3-2 | 100 | 300 | 45 | 1.0 | 0 | B10 |
| 3-3 | 90 | 300 | 35 | 1.0 | 10 | B10 |

The test was conducted in accordance with ASTM C-666 method A (freezing in water and fusing in water).

The "durability factor DF" according to the same test method is represented by:

$$DF = \frac{P \cdot N}{Ns} \, (\%)$$

P: Relative elastic modulus at N cycle (%)
N: Number of the cycles at the end of the test
Ns: Prescribed number of cycles (=300 cycles)
In test No. 1, $$DF = \frac{60 \cdot 210}{300} = 42\%$$

In test No. 2, $$DF = \frac{60 \cdot 300}{300} = 60\%$$

In test No. 3, $$DF = \frac{102 \cdot 300}{300} = 102\% = 100\%$$

The cement admixture and the polymer cement composition of the present invention provide excellent compression strength and adhesive strength without impairing fluidity even when the water/cement ratio is lowered, and they are effective for improving the density and the durability.

We claim:

1. A cement additive admixture comprising a polymer latex and a soluble water reducing agent wherein the copolymer latex comprises a copolymer of monomers comprising ethylene, vinyl acetate and an acrylic ester, in a ratio of 98:2 to 10:90 by weight of copolymer latex solids to the soluble water reducing agent, said soluble water reducing agent being an additive to cement capable of reducing the required water/cement ratio for achieving a specified fluidity for the cement additive admixture, an emulsion stabilizer for stabilizing the copolymer latex, said emulsion stabilizer being a surfactant which is an anionic, cationic, or nonionic surfactant, and inorganic ultrafine particles wherein the ratio of solid content of the copolymer latex to the ultrafine particles is 95:5 to 5:95 by weight, said ultrafine particles having an average particle size smaller than the particle size of the cement.

2. The cement additive admixture according to claim 1 wherein said copolymer is a copolymer of monomers comprising from 3 to 25 parts by weight of ethylene, from 2 to 60 parts by weight of vinyl acetate, from 25 to 85 parts by weight of an acrylic ester and from 0 to 10 parts by weight of other copolymerizable monomers.

3. The cement additive admixture according to claim 1 wherein the soluble water reducing agent is a melamine resin sulfonate.

4. The cement additive admixture according to claim 1 wherein the soluble water reducing agent is at least one member selected from the group consisting of a salt of a naphthalene sulfonic acid formaldehyde condensation product, a salt of an alkylnaphthalene sulfonic acid formaldehyde condensation product, a lignin sulfonate and a polystyrene sulfonate.

5. The cement additive admixture according to claim 1, wherein the ultra fine particles are at least one member selected from the group consisting of silica fume, a pulverized product of blast furnace slag and a pulverized product of fly ash.

6. A cement composition comprising an inorganic hydraulic cement and the cement additive admixture of claim 1 in an amount to supply 0.15 to 5 parts by weight of the soluble water reducing agent relative to 100 parts by weight of the inorganic hydraulic cement.

7. A cement composition comprising an inorganic hydraulic cement and the cement additive admixture of claim 4 in an amount to supply 0.15 to 5 parts by weight of the soluble water reducing agent relative to 100 parts by weight of the inorganic hydraulic cement.

8. A cement composition comprising an inorganic hydraulic cement and the cement additive admixture of claim 5 in an amount to supply 0.15 to 5 parts by weight of the soluble water reducing agent relative to 100 parts by weight of the inorganic hydraulic cement.

* * * * *